United States Patent [19]

Ishibashi et al.

[11] 4,331,784

[45] May 25, 1982

[54] POLYMER PARTICLES COMPRISING ETHYLENICALLY UNSATURATED MONOMERS AS MAIN CONSTITUENT AND HAVING LOCALIZED THEREON CONJUGATED DIOLEFIN (CO-)POLYMER LAYER

[75] Inventors: Yoshiyuki Ishibashi; Eijiro Tagami; Teruo Hiraharu; Shiro Yasukawa, all of Yokkaichi, Japan

[73] Assignee: Japan Synthetic Rubber Co., Ltd., Tokyo, Japan

[21] Appl. No.: 195,178

[22] Filed: Oct. 8, 1980

[30] Foreign Application Priority Data

Oct. 11, 1979 [JP] Japan ................................ 54-129895

[51] Int. Cl.³ .......................................... C08F 279/00
[52] U.S. Cl. .................................... 525/313; 525/261; 525/292; 525/301; 525/308; 525/902
[58] Field of Search ............... 525/213, 221, 222, 223, 525/228, 232, 234, 235, 236, 237, 238, 241, 246, 258, 260, 261, 263, 292, 301, 308, 313, 902

[56] References Cited

U.S. PATENT DOCUMENTS

| | | | |
|---|---|---|---|
| 3,661,994 | 5/1972 | Hwa et al. | 525/902 |
| 4,134,872 | 1/1979 | Lee | 525/902 |
| 4,156,669 | 5/1979 | Lee | 260/29.7 R |

FOREIGN PATENT DOCUMENTS 45-144951 12/1970 Japan.
53-2590 1/1978 Japan.

Primary Examiner—J. Ziegler
Attorney, Agent, or Firm—Oblon, Fisher, Spivak, McClelland & Maier

[57] ABSTRACT

Polymer particles composed of particles of a polymer (I) consisting of 96 to 100% by weight of at least one ethylenically unsaturated monomer and 4 to 0% by weight of at least one $\alpha,\beta$-ethylenically unsaturated carboxylic acid, and a (co-)polymer (II) comprising 100 to 10% by weight of a conjugated diolefin which is localized on the surface layer of the particles of the polymer (I) at a (I)/(II) weight ratio of 100/5–100/90. The localized polymer part of the polymer particles is very active, and the polymer particles are easy to modify with a monomer having any functional group, and hence are elemental materials having a high function and being utilizable for various purposes.

30 Claims, 8 Drawing Figures

POLYMER PARTICLES COMPRISING ETHYLENICALLY UNSATURATED MONOMERS AS MAIN CONSTITUENT AND HAVING LOCALIZED THEREON CONJUGATED DIOLEFIN (CO-)POLYMER LAYER

This invention relates to a novel material composed of polymer particles and a different kind of polymer localized on the surface layer of the particles. More particularly, it relates to a novel, highly functional, elemental material composed of polymer particles having localized thereon a (co)-polymer comprising a conjugated diolefin.

It is known that there are emulsions having separated different phases, such as so-called core-shell emulsions in which the outer layer part (shell part) and the inner layer part (core part) are made from different polymers produced by emulsion or suspension polymerization (Papers on High Polymers 31, 576 (1974), and emulsions consisting of polymer particles of uneven confetto-like form (Papers on High Polymers) 33, 575 (1976).

Japanese Patent Publication 144,951/78 discloses a latex consisting of 10 to 50 parts by weight of a hard polymer and 50 to 90 parts by weight of a soft polymer, in which different kinds of polymers are separated into different phases, and the latex obtained is useful for coating paper therewith.

The present inventors have also studied the localization of a different kind of polymer on the surface layer of polymer particles and have consequently succeeded in localization of a conjugated diolefin (co-)polymer on the surface layer of polymer particles.

An object of this invention is to provide polymer particles having a different kind of polymer localized on their surfaces.

Another object of this invention is to provide a method for the localization of a different kind polymer on the surfaces of polymer particles.

Other objects and advantages of this invention will become apparent from the following description.

According to this invention, there are provided polymer particles composed of (I) a polymer obtained by polymerizing 96 to 100% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms and vinyl cyanide compounds, with 4 to 0% by weight of at least one $\alpha,\beta$-ethylenically unsaturated carboxylic acid, and (II) a conjugated diolefin (co-)polymer localized on the surface of the particles of the polymer (I) at a (I)/(II) weight ratio of 100/5-100/90.

According to this invention, there is further provided a process for producing polymer particles composed of (I) particles of a polymer and (II) a conjugated diolefin (co-)polymer localized on the surface layer of the particles of the polymer (I) at a (I)/(II) weight ratio of 100/5-100/90, which comprises emulsion-polymerizing 100 parts by weight of a monomer mixture comprising 96 to 100% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms and vinyl cyanide compounds, and 4 to 0% by weight of at least one $\alpha,\beta$-ethylenically unsaturated carboxylic acid, by use of 0 to 6 parts by weight of an emulsifier and 0.1 to 5 parts by weight of a persulfate in water as a medium, to produce particles of a polymer (I), and polymerizing in the presence of 100 parts by weight of the particles of the polymer (I) 50 to 150 parts by weight of a monomer mixture comprising 100 to 10% by weight of a conjugated diolefin and 0 to 90% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms and vinyl cyanide compounds, without freshly adding an emulsifier, or with an emulsifier in an amount of 1 to 6 parts by weight per 100 parts by weight of the monomer.

The localized polymer part of the polymer particles of this invention is very active because it is a conjugated diolefin (co-)polymer, and accordingly, said polymer particles are easy to modify with a monomer having any functional group, and are highly functional, elemental materials utilizable for various purposes as compared with conventional polymer particles in the form of separated different phases.

The term "localization" used herein means that the major part (90% by weight or more)) of the (co-)polymer (II) cohere locally in substantially one place to form a consecutive layer, and does not mean that the (co-)polymer (II) cohere locally in plural places in almost the same proportion. However, this invention also includes the case where the major part of the (co-)-polymer (II) cohere locally in one place and the rest cohere locally in plural places.

This can easily be confirmed by the electron microphotograph taken after staining the conjugated diolefin polymer part in the polymer particles with osmium tetraoxide.

The polymer (I) consists of 96 to 100% by weight of at least one ethylenically unsaturated monomer and 4 to 0% by weight of at least one $\alpha,\beta$-ethylenically unsaturated carboxylic acid. When the amount of the $\alpha,\beta$-ethylenically unsaturated carboxylic acid exceeds 4% by weight, the localization tends to take place in plural places.

The ethylenically unsaturated monomer includes aromatic vinyl monomers such as styrene, $\alpha$-methylstyrene, halogenated styrenes, and the like; alkyl acrylates whose alkyl group has 1 to 8 carbon atoms, such as ethyl acrylate, butyl acrylate, 2-ethylhexyl acrylate, and the like; alkyl methacrylates whose alkyl group has 1 to 12 carbon atoms, such as methyl methacrylate, butyl methacrylate, lauryl methacrylate, and the like; vinyl cyanide compounds such as acrylonitrile, methacrylonitrile, and the like. These may be used alone or in admixture of two or more. Among them, preferable are styrene, methyl methacrylate, ethyl acrylate, butyl acrylate, 2-ethylhexyl acrylate and acrylonitrile.

The ,$\beta$-ethylenically unsaturated carboxylic acid includes unsaturated monocarboxylic acids such as acrylic acid, methacrylic acid, and the like; unsaturated dicarboxylic acids such as itaconic acid, maleic acid, fumaric acid, and the like; and monoesters of unsaturated dicarboxylic acids, such as monomethyl ester of itaconic acid, monoethyl ester of maleic acid, and the like, and these may be used alone or in combination. Among them, preferable are acrylic acid, methacrylic acid and itaconic acid.

In addition, functional monomers such as acrylamide, methacrylamide, N-methylolacrylamide, 2-hydroxyethyl acrylate, 2-hydroxyethyl methacrylate, glycidyl methacrylate and the like may be substituted for a part of the ethylenically unsaturated monomer.

For the production of the particles of the polymer (I), well-known methods may be used; however it is advisable that an emulsifier is not used or is used in a small amount. Particularly when no $\alpha,\beta$-ethylenically unsaturated carboxylic acid is used, it is better that an emulsifier is not used. In this case, the use of a large amount of an emulsifier makes the localization of the different kind of polymer difficult.

Examples of the production method are shown below. An example of the production of a copolymer latex of styrene and acrylonitrile without an emulsifier is described in Journal of Polymer Science XXI(98) 343 (1956). An example of the polymerization of styrene without an emulsifier is reported in the Journal of Applied Polymer Science 15, 867 (1971) and Kolloid-Zeitschrift und Zeitschrift für Polymer 239, 677 (1970), and an example of the polymerization of methyl methacrylate without an emulsifier is reported in Papers on High Polymer 33, 549 (1976). Further, an example of the copolymerization of an $\alpha,\beta$-ethylenically unsaturated carboxylic acid with styrene without an emulsifier is described in the Journal of Applied Polymer Science 18, 427 (1974). An example in which a small amount of an emulsifier is used is proposed in Japanese Patent Kokai (Laid-Open) No. 30472/74. The particles of the polymer (I) may be produced by any of the above-mentioned methods. When an $\alpha,\beta$-ethylenically unsaturated carboxylic acid is used, the localization of the different kind of polymer is possible even if an emulsifier is used in a large amount (for example, 10 parts by weight per 100 parts by weight of the monomer). However, when it is desired to introduce a functional monomer into the different kind of polymer to impart a functionality thereto, the presence of a large amount of an emulsifier in the polymer sometimes makes it impossible. Therefore, the amount of the emulsifier is preferably 6 parts by weight or less, more preferably 1 part by weight or less, per 100 parts by weight of the monomers constituting the polymer (I), and it is most preferable to use no emulsifier.

The emulsifiers, which may be used alone or in combination of two or more, include anionic emulsifiers such as sodium dodecylbenzenesulfonate, sodium laurylsulfate, ammonium laurylsulfate, sodium dodecyldiphenyloxidedisulfonate, and the like; and nonionic emulsifiers such as polyoxyethylene lauryl ether, polyoxyethylene nonylphenol ether, and the like. Among them, particularly preferable are sodium dedecylbenzenesulfonate, sodium laurylsulfate and sodium dodecyldiphenyloxidedisulfonate.

As the initiator used for producing the particles of the polymer (I), persulfates such as potassium persulfate, ammonium persulfate, sodium persulfate, and the like are preferred. The amount of the persulfate is 0.1 to 5 parts by weight, preferably 0.1 to 3 parts by weight, per 100 parts by weight of the monomers constituting the polymer (I). When it is less than 0.1 part by weight, the reaction time becomes very long, and this is uneconomical. When it is more than 5 parts by weight, a large amount of coagulum is sometimes formed during the reaction, and therefore, said amount is not desirable. Further, sodium hydrogen sulfite, sodium thiosulfate, sodium metabisulfite and the like may be used as a reducing agent together with the initiator. In addition, there may be used additives which can usually be used for emulsion polymerization, for example, a molecular weight regulator, such as t-dodecylmercaptan, carbon tetrachloride, and the like; and a chelating agent such as sodium ethylenediaminetetraacetate, and the like.

The conjugated diolefin (co-)polymer (II) consists of 100 to 10% by weight of a conjugated diolefin and 0 to 90% by weight of at least one ethylenically unsaturated monomer selected from the group sonsisting of aromatic vinyl compounds, alkyl acrylates whose alkyl group has 1 to 8 carbon atoms, alkyl methacrylates whose alkyl group has 1 to 12 carbon atoms and vinyl cyanide compounds, and preferably it consists of 100 to 50% by weight of a conjugated diolefin and 0 to 50% by weight of the above-mentioned ethylenically unsaturated monomer or monomers.

The conjugated diolefin includes butadiene, isoprene, chloroprene and the like. Particularly preferable is butadiene.

As the ethylenically unsaturated monomer or monomers, the same monomer or monomers as used in the polymer (I) may also be used.

A method for the localization of the (co-)polymer (II) on the surface layer of particles of the polymer (I) comprises polymerizing the monomer or monomers to constitute the (co-)polymer (II) while charging the monomer or monomers at one time or continuously into an aqueous phase containing the particles of the polymer (I) and an initiator.

The monomer or monomers constituting the (co-)polymer (II) are used in an amount of 50 to 150 parts by weight per 100 parts by weight of the particles of the polymer (I). In order to control the weight ratio of the polymer (I)/(co-)polymer (II) to 100/5–100/90, the reaction of the monomer or monomers constituting the (co-)polymer (II) is terminated at a polymerization conversion of 80% or less, preferably 70% or less.

When the size of particles of the polymer (I) is smaller than about $0.1\mu$, a method of continuously charging the monomer or monomers to constitute the (co-)polymer (II) is suitable.

When the size of particles of the polymer (I) is larger than about $0.1\mu$, a method of charging the monomer or monomers at one time to constitute the (co-)polymer (II) is suitable, and a method of adding the monomer or monomers in an amount of 50 parts by weight or more per 100 parts by weight of the particles of the polymer (I) is particularly suitable.

The pH at the time of the polymerization is not critical, though it ranges usually from 2 to 10. The polymerization is effected at a temperature in the range in which conventional emulsion polymerization is effected, though temperatures in the range from 30° to 100° C. are preferred.

As the initiator used for producing the (co-)polymer (II), preferable are persulfates such as potassium persulfate, sodium persulfate, ammonium persulfate, and the like; hydroperoxides such as hydrogen peroxide and the like; and azo type initiators such as azobisisobutyronitrile (AIBN), azobisdimethylvaleronitrile and the like. The amount of the initiator used is usually up to 3 parts by weight per 100 parts by weight of the monomers. Sodium hydrogensulfite, sodium thiosulfate, sodium metabisulfite, and the like may be used as a reducing agent together with the initiator. In addition, there may be used other additives which can usually be used for emulsion polymerization, for example, a molecular weight regulator, such as t-dodecylmercaptan, carbon tetrachloride, and the like; and a chelating agent such as sodium ethylenediaminetetraacetate, and the like.

The type of the localization is varied depending upon whether the polymer (I) has been carboxymodified or not. That is to say, when the polymer (I) is not a copolymer of at least one ethylenically unsaturated monomer and at least one α, β-ethylenically unsaturated carboxylic acid, the localization takes place in plural places (not in substantially one place) or takes place symmetrically unless the emulsifier is used in the polymerization for producing the (co-)polymer (II). When the emulsifier is used, the production of the polymer-localized particles, which are the object of this invention, becomes possible. In this case, the amount of the emulsifier used is 1 to 6 parts by weight per 100 parts by weight of the monomers to constitute the (co-)polymer (II). When it is more than 6 parts by weight, there is a tendency that the localization takes place in plural places, or independent particles of the (co-)polymer (II) are formed. When it is less than 1 part by weight, the localization tends to take place in plural places.

On the other hand, when the polymer (I) has been carboxy-modified by at least one α, β-ethylenically unsaturated carboxylic acid, the localization is possible unless the emulsifier is used, though the polymer-localized particles can be allowed to have a shape like a tubular toy by using the emulsifier. The amount of the emulsifier used in this case is up to 6 parts by weight per 100 parts by weight of the monomers to constitute the (co-)polymer (II). When it is more than 6 parts by weight, independent particles of the (co-)polymer (II) tend to be formed.

The emulsifiers include anionic emulsifiers such as sodium dodecylbenzenesulfonate, sodium laurylsulfate, ammonium laurylsulfate, sodium dodecyldiphenyloxidedisulfonate, and the like; and nonionic emulsifiers such as polyoxyethylene lauryl ether, polyoxyethylene nonylphenyl ether, and the like. Particularly preferable are sodium dodecyl benzenesulfonate, sodium laurylsulfate, sodium dodecyldiphenyloxidedisulfonate, and the like.

The following two processes are most suitable for producing the polymer-localized particles of this invention:

(1) A process comprising emulsion-polymerizing 100 parts by weight of a monomer mixture consisting of 0.5 to 4% by weight of an α, β-ethylenically unsaturated carboxylic acid and 96 to 99.5% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms and vinyl cyanide compounds with 0 to 6 parts by weight of an emulsifier and 0.1 to 5 parts by weight of a persulfate in water as a medium, to prepare particles of a polymer (I) and then polymerizing, in the presence of 100 parts by weight of the particles of the polymer (I), 50 to 150 parts by weight of a monomer mixture consisting of 100 to 10% by weight of a conjugated diolefin and 0 to 90% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms and vinyl cyanide compounds without adding a fresh emulsifier, thereby preparing localized (co-)polymer (II) on the surface layer of the particles of polymer (I) in a polymer (I)/(co-)polymer (II) weight ratio of 100/5 to 100/90.

(2) A process comprising emulsion-polymerizing 100 parts by weight of a monomer mixture consisting of 0 to 4% by weight of an α, β-ethylenically unsaturated carboxylic acid and 96 to 100% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms, and vinyl cyanide compounds with 0.1 to 5 parts by weight of a persulfate without any emulsifier in water as a medium, and then polymerizing, in the presence of 100 parts by weight of the particles of polymer (I) thus produced, 50 to 150 parts by weight of a monomer mixture consisting of 100 to 10% by weight of a conjugated diolefin and 0 to 90% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms, and vinyl cyanide compounds with 1 to 6 parts by weight of an emulsifier, thereby preparing localized (co-)polymer (II) on the surface layer of the particles of the polymer (I) in a polymer (I)/(co-)polymer (II) weight ratio of 100/5 to 100/90.

The weight ratio of the polymer (I) to the (co-)polymer (II) must be 100/5–100/90. The (I)/(II) weight ratio ranges preferably from 100/5 to 100/80, and particularly preferably from 100/10 to 100/60. When the amount of the (co-)polymer (II) is less than 5 parts by weight per 100 parts by weight of the polymer (I), a sufficient effect of the localization of the (co-)polymer (II) cannot be obtained. When the amount of the (co-)polymer (II) exceeds 90 parts by weight per 100 parts by weight of the polymer (I), the localization tends to take place in plural places so that the desired polymer-localized particles are difficult to obtain.

The size of the polymer particles is not critical, though it is preferably 0.05 to 5μ, more preferably 0.05 to 1μ, most preferably 0.1 to 0.8μ.

The localized polymer part of the polymer particles having localized thereon a different kind of polymer of this invention is very active, and can easily be modified with monomers having various functional groups, and hence, the polymer-localized particles can be used for various purposes by utilizing their anisotropy.

For example, polymer particles in which polybutadiene is localized on the surface layer of modified polystyrene particles can readily adsorb an antibody protein, and hence are useful as a support of immunonogical diagnostic medicines. A polymer particle in which polybutadiene is localized on the surface layer of carboxy-modified polyacrylate particles has parts different in adhesiveness in one and the same particle, and therefore, when the particle is used in admixture with carbon black, iron oxide or the like in a pressure-fixing toner for electrostatic photograph, there can be obtained a toner poor in cohesiveness and good in fixability. Further, the adhesiveness of the polymer particles of this invention to a base material such as iron, glass, or the like can be improved by reacting glycidyl methacrylate with the remaining double bonds in the localized polybutadiene.

This invention is further explained below in more detail referring to Examples and the accompanying drawings. In the accompanying drawings.

In the Examples, parts and % are by weight, unless otherwise specified. The Examples are not by way of limitation but by way of illustration.

EXAMPLE 1

Into a one-liter four-necked glass separable flask equipped with a stirrer were charged 170 parts of distilled water and 0.5 part of potassium persulfate, and the air in the flask was replaced with nitrogen, after which the contents of the flask were heated to 80° C. on a water bath with stirring. Subsequently, a mixture of 98 parts of styrene, 2 parts of methacrylic acid and 1 part of t-dodecylmercaptan was continuously added dropwise to the contents over a period of 8 hours. The resulting mixture was further polymerized at 90° C. for 2 hours. The polymerization conversion was 99%. A dispersion of polymer particles having an average particle size of about $0.7\mu$ and a relatively uniform particle size distribution was obtained. The pH of the dispersion was adjusted to 9 with sodium hydroxide. Ten parts, in terms of solids, of the polymer particle dispersion thus obtained, 10 parts of butadiene, 0.2 part of potassium persulfate and 40 parts of distilled water were charged into a 300-ml pressure bottle, and then subjected to polymerization for 20 hours with stirring in a thermostat at 60° C. The polymerization conversion was 23%. Therefore, the (I)/(II) weight ratio was 100/23. The unreacted butadiene was removed by steam distillation.

Figure 1:
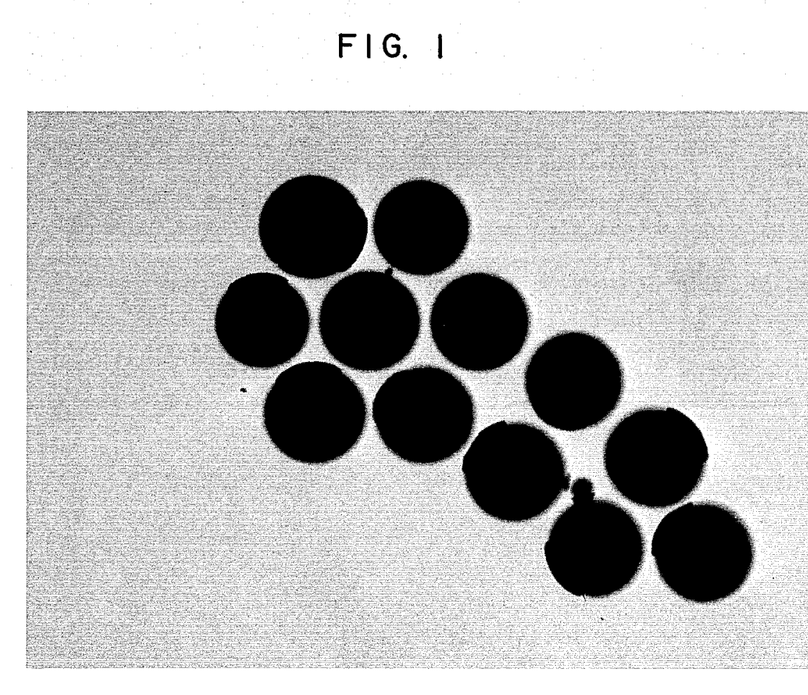
FIGS. 1 to 7 are electron microphotographs of the polymer particles of this invention obtained in Examples 1 to 7, respectively.

The polymer particles obtained were treated with osmic acid according to a conventional method, and then observed with a transmission type electron microscope. The electron microphotograph is shown in FIG. 1. It can clearly be seen from FIG. 1 that particles in which polybutadiene had been localized on the surface layer of the carboxy-modified polystyrene particles were obtained.

EXAMPLE 2

In the same way as in Example 1, 99 parts of styrene and 1 part of methacrylic acid were polymerized. The polymerization conversion was 98%, and the average particle size was about $0.6\mu$. Ten parts, in terms of solids, of the polymer particle dispersion obtained, 2.5 parts of butadiene and 7.5 parts of styrene were polymerized in the same way as in Example 1. The polymerization conversion was 55% (the weight ratio (I)/(II)100/55).

Figure 2:
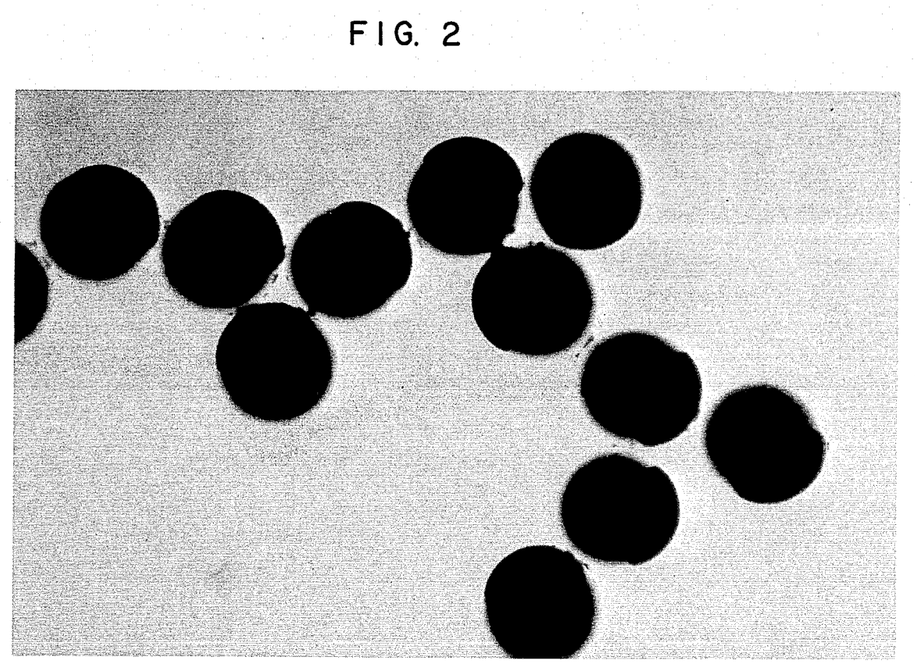

The polymer particles obtained were treated with osmic acid, and then observed with an electron microscope. The electron microphotograph is shown in FIG. 2. It was observed that particles in which a butadiene-styrene copolymer was localized on the surface layer of the carboxy-modified polystyrene particles.

EXAMPLE 3

In the same way as in Example 1, 30 parts of ethyl acrylate, 68 parts of methyl methacrylate and 2 parts of methacrylic acid were polymerized. The polymerization conversion was 99%, and the average particle size was about $0.3\mu$. Ten parts, in terms of solids, of the polymer particle dispersion obtained and 10 parts of butadiene were polymerized in the same way as in Example 1. The polymerization conversion was 37% (the weight ratio (I)/(II)=100/37).

The polymer particles obtained were treated with osmic acid, and then observed with an electron microscope.

Figure 3:
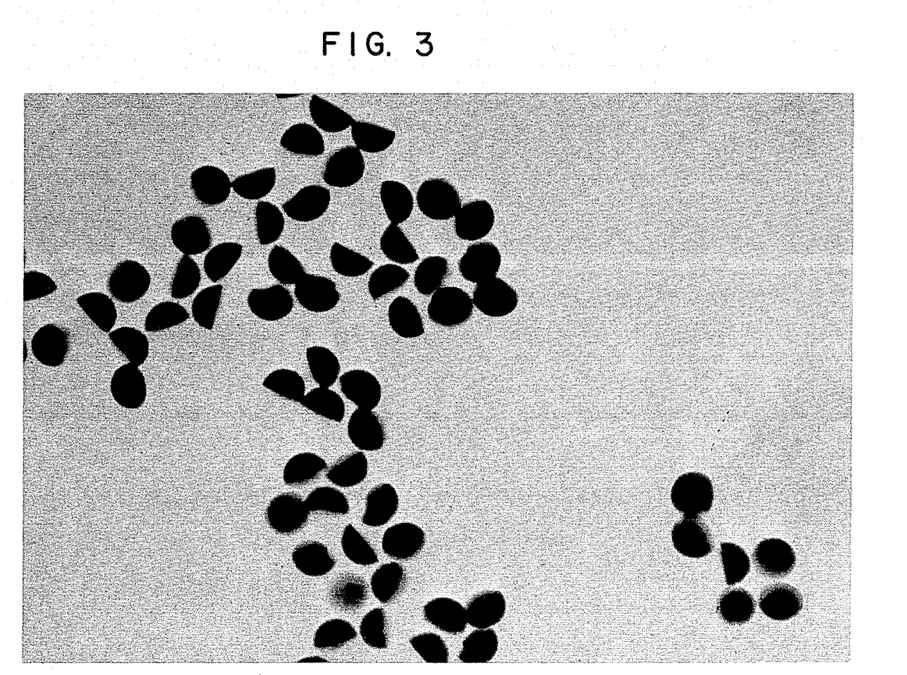

The electron microphotograph is shown in FIG. 3. In the photograph, the particles are semicircular, and this is because the localized polybutadiene part was fixstained with osmic acid, and the unlocalized ethyl acrylate-methyl methacrylate-methacrylic acid copolymer parts were not stained with osmic acid, and hence, transmitted electron rays, so that said parts was invisible.

EXAMPLE 4

In the same way as in Example 1, 97 parts of styrene and 3 parts of methacrylic acid were polymerized. The polymerization conversion was 99%, and the average particle size was about $0.7\mu$. Ten parts, in terms of solids, of the polymer particle dispersion obtained, 10 parts of butadiene, 0.4 part of sodium dodecylbenzenesulfonate as an emulsifier, 0.2 part of potassium persulfate and 40 parts of distilled water were charged into a 300-ml pressure bottle, and then subjected to polymerization for 20 hours with stirring in a thermostat at 60° C. The polymerization conversion was 13% (the (I)/(II) weight ratio=100/13). The unreacted butadiene was removed by steam distillation.

Figure 4:
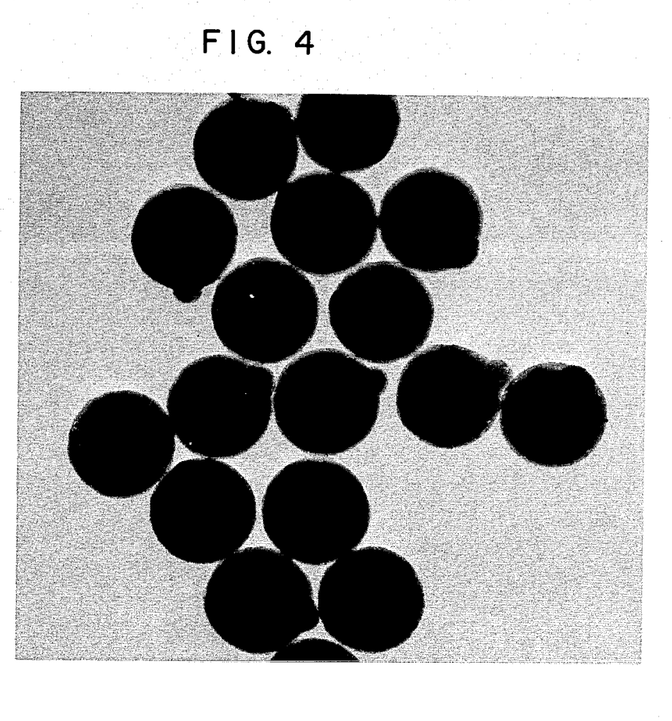

The polymer particles obtained were treated with osmic acid according to a conventional method, and then observed with a transmission type electron microscope. The electron microphotograph is shown in FIG. 4. As is apparent therefrom, it can be seen that polymer-localized particles were obtained.

EXAMPLE 5

Figure 5:
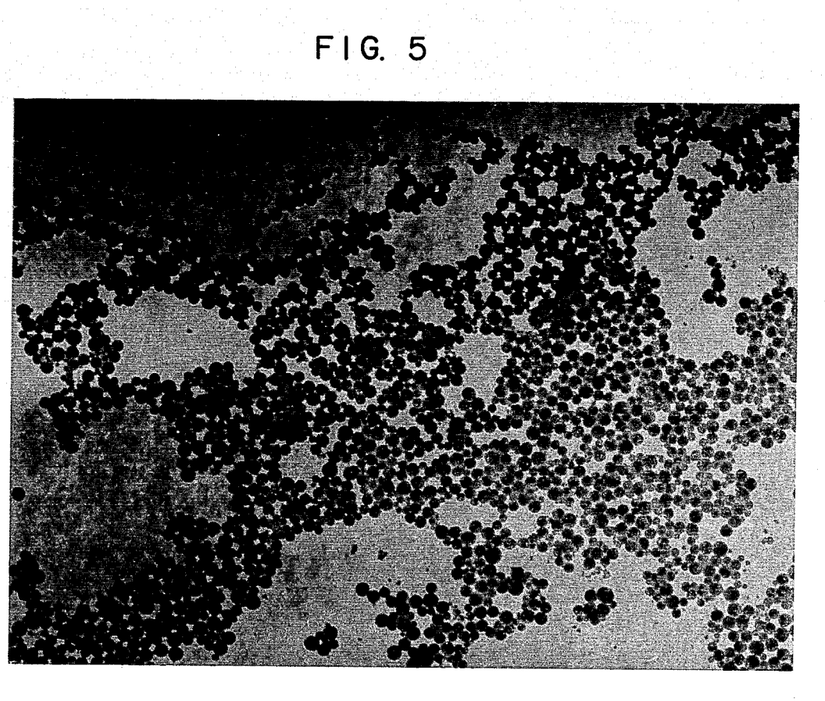

The air in a 100-liter stainless steel autoclave equipped with a stirrer and a jacket was replaced with nitrogen, after which 70 parts of styrene, 27 parts of methyl methacrylate, 2 parts of acrylic acid, 1 part of itaconic acid, 4 parts of sodium dodecylbenzenesulfonate, 5 parts of carbon tetrachloride, 2 parts of potassium persulfate, 0.01 part of sodium ethylenediaminetetraacetate and 200 parts of ion-exchanged water were charged into the autoclave, and then subjected to polymerization at 50° C. for 3 hours. The polymerization conversion was 98%. Subsequently, 60 parts of butadiene was continuously charged thereinto over a period of 8 hours. The contents of the autoclave were further subjected to polymerization at 70° C. for 2 hours. The polymerization conversion was 99%. Therefore, the (I)/(II) weight ratio was about 100/60. The average particle size of the polymer particles obtained was about 800 Å. The polymer particles were treated with osmic acid, and then observed with an electron microscope to find that polybutadiene-localized particles were obtained. The electron microphotograph is shown in FIG. 5.

EXAMPLE 6

Into the same separable flask as in Example 1 were charged 200 parts of distilled water, 90 parts of styrene, 10 parts of acrylonitrile and 2 parts of potassium persulfate, and the air in the flask was sufficiently replaced with nitrogen, after which the contents of the flask were heated to 55° C. on a water bath with stirring. When the temperature of the contents reached 55° C., a solution of 2 parts of sodium hydrogensulfite in 50 parts of distilled water was charged into the flask, and the resulting mixture was subjected to polymerization for 3 hours. The polymerization conversion was 98%. The average particle size was about 0.4μ. Ten parts, in terms of solids, of the polymer particle dispersion obtained, 10 parts of butadiene, 0.2 part of potassium persulfate, 40 parts of distilled water and 0.2 part of sodium dodecylbenzenesulfonate were charged into a 300-ml pressure bottle, and then subjected to polymerization for 20 hours with stirring in a thermostat at 60° C. The polymerization conversion was 18% (the (I)/(II) weight ratio=100/18). The unreacted butadiene was removed by steam distillation.

Figure 6:
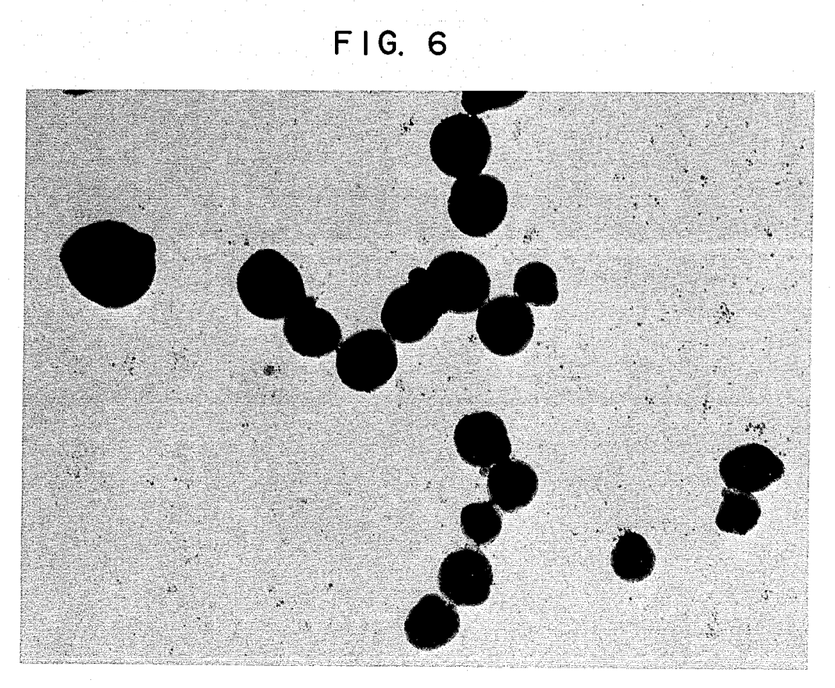

The polymer particles obtained were treated with osmic acid, and then observed with an electron microscope. The electron microphotograph is shown in FIG. 6. It can be seen that polybutadiene-localized particles were obtained.

EXAMPLE 7

Ten parts, in terms of solids, of the polymer particle dispersion obtained in Example 2, 5 parts of butadiene, 5 parts of butyl acrylate, 0.3 part of potassium persulfate and 40 parts of distilled water were charged into a 300-ml pressure bottle, and then subjected to polymerization for 20 hours with stirring in a thermostat at 60° C. The polymerization conversion was 45% (the (I)/(II) weight ratio=100/45). The unreacted butadiene was removed by steam distillation.

Figure 7:
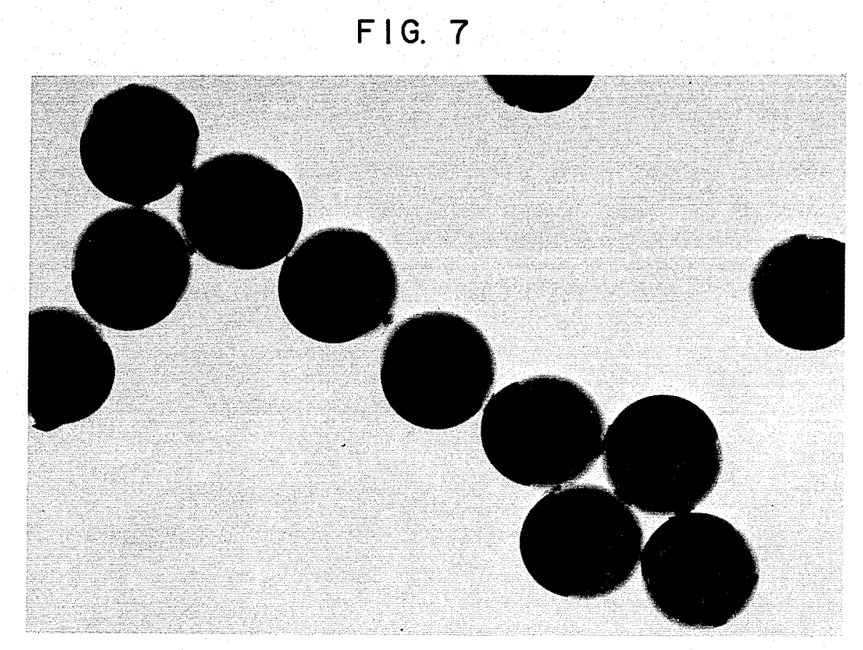

The polymer particles obtained were treated with osmic acid according to a conventional method, and then observed with an electron microscope. The electron microphotograph is shown in FIG. 7. It can be seen that butadiene-butyl acrylate copolymer-localized particles were obtained.

EXAMPLE 8

In 100 parts, in terms of solids, of the polymer particle dispersion obtained in Example 3 was dispersed 10 parts of water-dispersible carbon black (Coloidex No. 5 manufactured by Columbia Carbon Co., U.S.A.) with an emulsifier to obtain a uniform slurry.

The slurry was spray-dried to obtain a toner powder. An iron powder carrier was mixed with the toner powder to prepare a toner. When an electrostatic latent image was formed on a commercially available electrostatic recording paper (EG paper manufactured by Minolta Co., Ltd.) according to a conventional method, developed with the aforesaid toner, and then fixed by means of a pressure roll, a clear image was obtained.

For comparison, the polymer particles in Example 3 were replaced by the polymer particles obtained in the following manner: Into a 5-liter stainless steel autoclave were charged 180 parts of water and 0.5 part of potassium persulfate, and they were heated to 70° C., after which 37 parts of butadiene, 30 parts of ethyl acrylate, 68 parts of methyl methacrylate, 2 parts of methacrylic acid and 1 part of t-dodecylmercaptan were mixed, and then continuously charged into the autoclave over a period of 8 hours, after which the mixture was subjected to polymerization. The polymerization conversion was 90%, and the average particle size was about 0.3μ. However, when the polymer particles obtained were treated with osmic acid and then observed with an electron microscope, it was found that the particles were of homogeneous polymer, and the localization of polybutadiene was not recognized.

By use of the polymer particle dispersion obtained, it was tried to prepare a toner powder in the same manner as above. However, only very coarse particles were obtained, and they were unsuitable as a toner.

EXAMPLE 9

The polymer particle dispersion obtained in Example 1 was adjusted to pH 9.0 with sodium hydroxide, and then treated by means of a high-speed centrifugal separator at 5,000 r.p.m. for 20 minutes to settle the polymer particles. The supernatant was removed, and distilled water was added to the residue to disperse the polymer particles again. The same centrifugation treatment as above was repeated twice. The concentration of the polymer particle dispersion obtained was adjusted to 2%. With 10 g of the dispersion was mixed 0.1 g of human γ-globulin, and 30 ml of a glycine buffer (pH 8.2) was added thereto, after which the resulting mixture was well mixed at 35° C. for 2 hours. The sample thus obtained was subjected to centrifugation treatment at 5,000 r.p.m. for 20 minutes, after which the supernatant was collected and 30 ml of a glycine buffer was added to the residue to disperse the polymer particles again. The same treatment as above was repeated twice to remove the unadsorbed human γ-globulin. The amount of the unadsorbed human γ-globulin in the collected supernatant was determined by measuring the absorbance at a wavelength of 280 nm, and the balance was determined to be the amount of the human γ-globulin adsorbed on the polymer particles. The absorbed amount was 80 mg per g of the polymer particles. For comparison, the polymer particles before the localization of polybutadiene in Example 1 were used, and the amount of human γ-globulin adsorbed was determined in the same way as above. It was 50 mg per g of the polymer particles.

From these facts, it is found that the polymerlocalized particles of this invention can readily absorb antibody protein (human γ-globulin).

COMPARATIVE EXAMPLE 1

In the same way as in Example 1, 95 parts of styrene and 5 parts of methacrylic acid were polymerized. The polymerization conversion was 99%, and the average particle size was about 0.5μ. Subsequently, butadiene was polymerized in the same way as in Example 1. The polymerization conversion was 100% (the (I)/(II) weight ratio=100/100).

Figure 8:
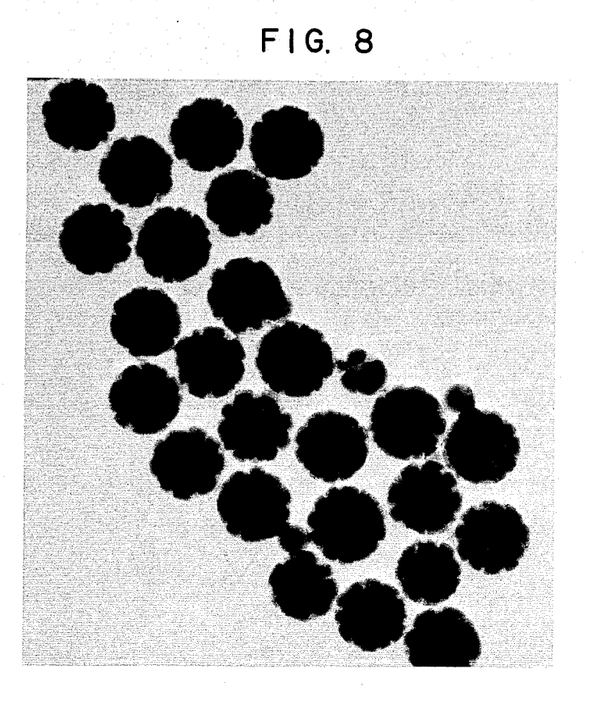
FIG. 8 is an electron microphotograph of the polymer particles obtained in Comparative Example 1. The magnifications of all the photographs are 30,000.

When the polymer particles obtained were treated with osmic acid and observed with an electron microscope, particles having localized polybutadiene in plural places were observed. The electron microphotograph thereof is shown in FIG. 8. Said particles are not the polymer particles of this invention.

What is claimed is:

1. Polymer particles composed of particles of a polymer (I) consisting of 96 to 99.5% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms and vinyl cyanide compounds and 4 to 0.5% by weight of at least one a,b-ethylenically unsaturated carboxylic acid, and a conjugated diolefin (co-)polymer (II), said (co-)polymer (II) being localized on the surface layer of the particles of the polymer (I) in substantially one place to form a consecutive layer in a polymer (I)/(co-)polymer (II) weight ratio of 100/10–100/60, wherein the (co-)polymer (II) consists of 100 to 50% by weight of a conjugated diolefin, wherein the conjugated diolefin is butadiene, isoprene or chloroprene, and 0 to 50% by weight of at least one ethylenically unsaturated momoner, wherein the ethylenically unsaturated monomer in the (co-)polymer (II) is at least one member selected from the group consisting of styrene, methyl methacrylate, ethyl acrylate, butyl acrylate, 2-ethylhexyl acrylate and acrylonitrile.

2. Polymer particles according to claim 1, wherein the ethylenically unsaturated monomer in the polymer (I) is at least one member selected from the group consisting of styrene, α-methylstyrene, halogenated styrenes, ethyl acrylate, butyl acrylate, 2-ethylhexyl acrylate, methyl methacrylate, butyl methacrylate, lauryl methacrylate, acrylonitrile and methacrylonitrile.

3. Polymer particles according to claim 1, wherein the ethylenically unsaturated monomer in the polymer (I) is at least one member selected from the group consisting of styrene, methyl methacrylate, ethyl acrylate, butyl acrylate, 2-ethylhexyl acrylate and acrylonitrile.

4. Polymer particles according to any one of claims 1 to 3, wherein the α,β-ethylenically unsaturated carboxylic acid in the polymer (I) is an unsaturated monocarboxylic acid.

5. Polymer particles according to claim 4, wherein the unsaturated monocarboxylic acid is acrylic acid or methacrylic acid.

6. Polymer particles according to any one of claims 1 to 3, wherein the α,β-ethylenically unsaturated carboxylic acid in the polymer (I) is an unsaturated dicarboxylic acid.

7. Polymer particles according to claim 6, wherein the unsaturated dicarboxylic acid is itaconic acid, maleic acid or fumaric acid.

8. Polymer particles according to any one of claims 1 to 3, wherein the α,β-ethylenically unsaturated carboxylic acid in the polymer (I) is a monoester of an unsaturated dicarboxylic acid.

9. Polymer particles according to claim 8, wherein the monoester of an unsaturated dicarboxylic acid is monomethyl ester of itaconic acid or monoethyl ester of maleic acid.

10. Polymer particles according to any one of claims 1 to 3, wherein the α,β-ethylenically unsaturated carboxylic acid in the polymer (I) is at least one member selected from the group consisting of acrylic acid, methacrylic acid and itaconic acid.

11. Polymer particles according to claim 1, wherein the conjugated diolefin is butadiene.

12. Polymer particles according to claim 1, wherein the polymer particles have a particle size of 0.05 to 1μ.

13. Polymer particles according to claim 12, wherein the particle size is 0.1 to 0.8μ.

14. A process for producing polymer particles which consists of polymerizing 100 parts by weight of a monomer mixture of 0.5 to 4% by weight of an a,b-ethylenically unsaturated carboxylic acid and 96 to 99.5% by weight of at least one ethylenically unsaturated monomer selected from the group consisting of aromatic vinyl compounds, alkyl alkylates whose alkyl group has 1 to 8 carbon atoms, alkyl methacrylates whose alkyl group has 1 to 12 carbon atoms and vinyl cyanide compounds, with 0.1 to 5 parts by weight of a persulfate without any emulsifier in water as a medium to prepare particles of polymer (I) and then polymerizing, in the presence of 100 parts by weight of the particles of the polymer (I), 50 to 150 parts by weight of a monomer mixture of 100 to 10% by weight of a conjugated diolefin and 0 to 90% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms and vinyl cyanide compounds, with 1 to 6 parts by weight, per 100 parts by weight of the monomers, of an emulsifier, to prepare a (co-)-polymer (II) localized on the surface layer of the particles of the polymer (I) in substantially one place to form a discontinuous consecutive layer in a polymer (I)/(co-)polymer (II) weight ratio of 100/5 to 100/90.

15. A process according to claim 14, wherein the polymerization of the monomer mixture to form the (co-)polymer is terminated at a polymerization conversion of 80% or less.

16. A process according to claim 15, wherein the polymerization conversion is 70% or less.

17. A process according to claim 14, wherein the ethylenically unsaturated monomer is selected from the group consisting of styrene, ethyl acrylate, butyl acrylate, 2-ethylhexyl arcylate, methyl methacrylate, butyl methacrylate, lauryl methacrylate, and acrylonitrile; the unsaturated carboxylic acid is selected from the group consisting of acrylic acid, methacrylic acid, and itaconic acid; and the conjugated diolefin is butadiene.

18. A process according to claim 14 wherein the polymer (I)/(co-)polymer (II) weight ratio is 100/10 to 100/60.

19. A process according to claim 14, wherein the particle size of the polymer-localized particles ranges from 0.05 to 1μ.

20. A process according to claim 19, wherein the particle size ranges from 0.1 to 0.8μ.

21. A process according to claim 14, wherein the monomer mixture of a conjugated diolefin and at least one ethylenically unsaturated monomer is at one time added to water containing the particles of the polymer (I), an initiator and the emulsifier, and the polymerization is effected at a pH of the polymerization system of 2 to 10 at a polymerization temperature of 30° to 100° C.

22. A process according to claim 21, wherein the initiator is potassium persulfate, sodium persulfate, ammonium persulfate, hydrogen peroxide, azobisisobutyronitrile, or azobisdimethylvaleronitrile, and the amount of the initiator is 3 parts by weight or less per 100 parts by weight of the monomer mixture.

23. A process according to claims 14 or 21, wherein the emulsifier is at least one member selected from the group consisting of sodium dodecylbenzenesulfonate, sodium laurylsulfate, ammonium laurylsulfate, sodium dodecyldiphenyloxidedisulfonate, polyoxyethylene nonylphenyl ether and polyoxyethylene lauryl ether.

24. A process for producing polymer particles which consists of emulsion-polymerizing 100 parts by weight of a monomer mixture of 4 to 0.5% by weight of an a,b-ethylenically unsaturated carboxylic acid and 96 to 99.5% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms and vinyl cyanide compounds, with 0 to 6 parts by weight of an emulsifier and 0.1 to 5 parts by weight of a persulfate in water as a medium, to prepare particles of a polymer (I), and then polymerizing, in the presence of 100 parts by weight of the particles of the polymer (I) obtained, 50 to 150 parts by weight of a monomer mixture of 100 to 10% by weight of a conjugated diolefin and 0 to 90% by weight of at least one ethylenically unsaturated monomer selected from the group consisting of aromatic vinyl compounds, alkyl acrylates whose alkyl group has 1 to 8 carbon atoms, alkyl methacrylates whose alkyl group has 1 to 12 carbon atoms an vinyl cyanide compounds without adding fresh emulsifier, to prepare a (co-)polymer (II) localized on the surface layer of the particles of the polymer (I) in substantially one place to form a discontinuous consecutive layer in a polymer (I) (co-)polymer (II) weight ratio of 100/5 to 100/90.

25. A process according to claim 30, wherein the polymerization of the monomer mixture to form the (co-)polymer is terminated at a polymerization conversion of 80% or less.

26. A process according to claim 25, wherein the polymerization conversion is 70% or less.

27. A process according to claim 24, wherein the ethylenically unsaturated monomer is selected from the group consisting of styrene, ethyl acrylate, butyl acrylate, 2-ethylhexyl acrylate, methyl methacrylate, butyl methacrylate, lauryl methacrylate, and acrylonitrile; the unsaturated carboxylic acid is selected from the group consisting of acrylic acid, methacrylic acid, and itaconic acid; and the conjugated diolefin is butadiene.

28. A process according to claim 30, wherein the polymer (I)/(co-)polymer (II) weight ratio is 100/10 to 100/60.

29. A process according to claim 24, wherein the particle size of the polymer-localized particles ranges from 0.05 to 1μ.

30. A process according to claim 29, wherein the particle size ranges from 0.1 to 0.8μ.

* * * * *